United States Patent [19]
Levine et al.

[11] Patent Number: 5,497,382
[45] Date of Patent: Mar. 5, 1996

[54] EXTENDED ERROR CORRECTION OF A TRANSMITTED DATA MESSAGE

[75] Inventors: Stephen N. Levine, Itasca; Michael P. Metroka, Algonquin, both of Ill.

[73] Assignee: Motorola, Inc., Schaumburg, Ill.

[21] Appl. No.: 258,134

[22] Filed: Jun. 10, 1994

Related U.S. Application Data

[63] Continuation of Ser. No. 763,464, Sep. 20, 1991, abandoned.

[51] Int. Cl.⁶ .................................................. H03M 13/00
[52] U.S. Cl. ............................................ 371/35; 370/30
[58] Field of Search .......................... 371/35, 37.1, 69.1, 371/36, 33, 32, 37.4, 37.2, 30, 37.6, 67.1, 68.2, 70

[56] References Cited

U.S. PATENT DOCUMENTS

| | | | |
|---|---|---|---|
| 3,624,603 | 11/1971 | Delcomyn | 340/146.1 |
| 3,681,578 | 8/1972 | Stevens | 371/36 |
| 3,737,577 | 6/1973 | Birkin | 178/23 A |
| 3,760,371 | 9/1973 | Pitroda et al. | 371/69.1 |
| 3,978,449 | 8/1976 | Sanders et al. | 340/146.1 BA |
| 4,045,771 | 8/1977 | Loreck | 340/146.1 BA |
| 4,344,171 | 8/1982 | Lin et al. | 371/35 |
| 4,447,903 | 5/1984 | Sewerinson | 371/68.2 |
| 4,584,685 | 4/1986 | Gajjar | 371/32 |
| 4,670,880 | 6/1987 | Jitsukawa et al. | 371/69.1 |
| 4,961,193 | 10/1990 | Debord et al. | 371/37.2 |
| 5,031,179 | 7/1991 | Yoshida et al. | 371/32 |
| 5,228,046 | 7/1993 | Blake et al. | 371/38.1 |
| 5,241,549 | 8/1993 | Moon et al. | 371/70 |

FOREIGN PATENT DOCUMENTS

| | | | |
|---|---|---|---|
| 0252037 | 10/1989 | Japan | 371/35 |
| 0011827 | 1/1991 | Japan | 371/67.1 |

OTHER PUBLICATIONS

"Preventive Error Control Scheme" by Yu et al IBM Technical Disclosure Bulletin vol. 24 No. 6 Nov. 1981.
Digital Communications, Fundamentals and Applications, Bernard Sklar, 287–288 (1988).

*Primary Examiner*—Hoa T. Nguyen
*Assistant Examiner*—Phung My Chung
*Attorney, Agent, or Firm*—Dale B. Halling; Donald C. Kordich

[57] ABSTRACT

The extended error correction process of the present invention error corrects a data message that has been transmitted a plurality of times. The process first receives the data message at least twice, logically combining the first and second messages received to form an error indication word. The error indication word is then used to locate the error locations in each message after which some of the errors are complemented, depending on the total number of errors found. The message is then decoded and used for transmit power changes, channel reassignment, to release a call, etc.

3 Claims, 6 Drawing Sheets

EXTENDED ERROR CORRECTION OF A TRANSMITTED DATA MESSAGE

This is a continuation of application Ser. No. 07/763,464, filed Sep. 20, 1991 and now abandoned.

FIELD OF THE INVENTION

The present invention relates generally to the field of communications and particularly to error correction of subaudible data words transmitted over a radio frequency channel.

BACKGROUND OF THE INVENTION

While operating in a cellular radiotelephone system, data messages are continuously transmitted between a radiotelephone and a base station. These messages include orders requesting the radiotelephone transceiver to change transmit power level, to change channel assignment, to release the call, or other similar requests. Some of these data messages are sent on the forward and reverse voice channels. In systems using subaudible data, the messages are interleaved in a continuous stream of data. A system as described in U.S. Pat. No. 4,984,290 (Levine et al.), assigned to the assignee of the present invention, is an example of such a system. Narrowband Advanced Mobile Service (NAMPS) is another example of such a system and is described in more detail in Motorola NAMPS Air Interface Specification Revision D, available from the assignee of the present invention. Sections 2.7.2.2 and 3.7.2.2 of the above specification give a more detailed description of the forward and reverse voice channels.

The data message format used on the narrow forward voice channel (base to radiotelephone) consists of 28 bits of content encoded into a (40, 28) error correcting Bose-Chaudhuri-Hocquenghem (BCH) coded Manchester modulated data message with a distance of five sent at 100 bits/second. The BCH code allows for the correction of two bit errors and is a shortened version of the standard (63, 51) BCH code. Full decoding, allowing two bit error correction of the (40, 28) BCH requires utilization of a complex decoding algorithm such as defined by Berlekamp which requires computation using Galois field arithmetic. S. Lin & D. Costello Jr., Error Control Coding, 141–183, (1983), discusses BCH decoding in more detail. A much more practical and less complex decoder is the error-trapping decoder, which allows for correction of one bit error. For the current description a single bit error trapper is assumed to be used as the BCH decoder.

The forward voice channel message is transmitted after a single transmission of a 30 bit word synchronization pattern sent at 200 bits/second using non-return to zero (NRZ) modulation. Four errors are allowed in the synchronization pattern. Bit synchronization is accomplished by receiving one of seven 24-bit continuously transmitted 200 bits/second Digital Supervisory Audio Tone (DSAT) sequences and maintaining synchronization to it. A (48, 36) BCH coded Manchester modulated data message is used on the narrow reverse voice channel (radiotelephone to base).

The reverse voice channel message is similarly transmitted after a single transmission of a 30 bit word synchronization pattern. Bit synchronization on the reverse voice channel is accomplished with a DSAT sequence similar to that of the forward voice channel.

Instead of multiple repeats, as used in some typical cellular systems, an automatic repeat request procedure (ARQ) is implemented for fading protection. When a BCH code correctable subaudible data message is received, an acknowledgement is sent by the receiving unit to the transmitting unit. The message may be transmitted a total of three times if an acknowledgement is not received by the sending unit.

If the radiotelephone is in a low signal level, multipath, or Rayleigh fading environment, the data message may contain uncorrectable errors when it is received. If the message is received three times with BCH code uncorrectable errors, the message is ignored and no acknowledgement is sent. There is a resulting need to correct these BCH code uncorrectable errors, thereby reducing the message error rate for subaudible data communications.

SUMMARY OF THE INVENTION

The method of the present invention error corrects a data message that has been transmitted a plurality of times. The method is comprised of the steps of receiving the data message at least twice, logically combining the first and second words received to form an error indication word, and decoding either the first or second received words by complementing at least one bit of the first or the second in response to the error indication word.

BRIEF DESCRIPTION OF THE DRAWINGS

FIG. 1 (A, B and C) show flowcharts of the process of the present invention.

DETAILED DESCRIPTION OF THE PREFERRED EMBODIMENT

Figure 5:
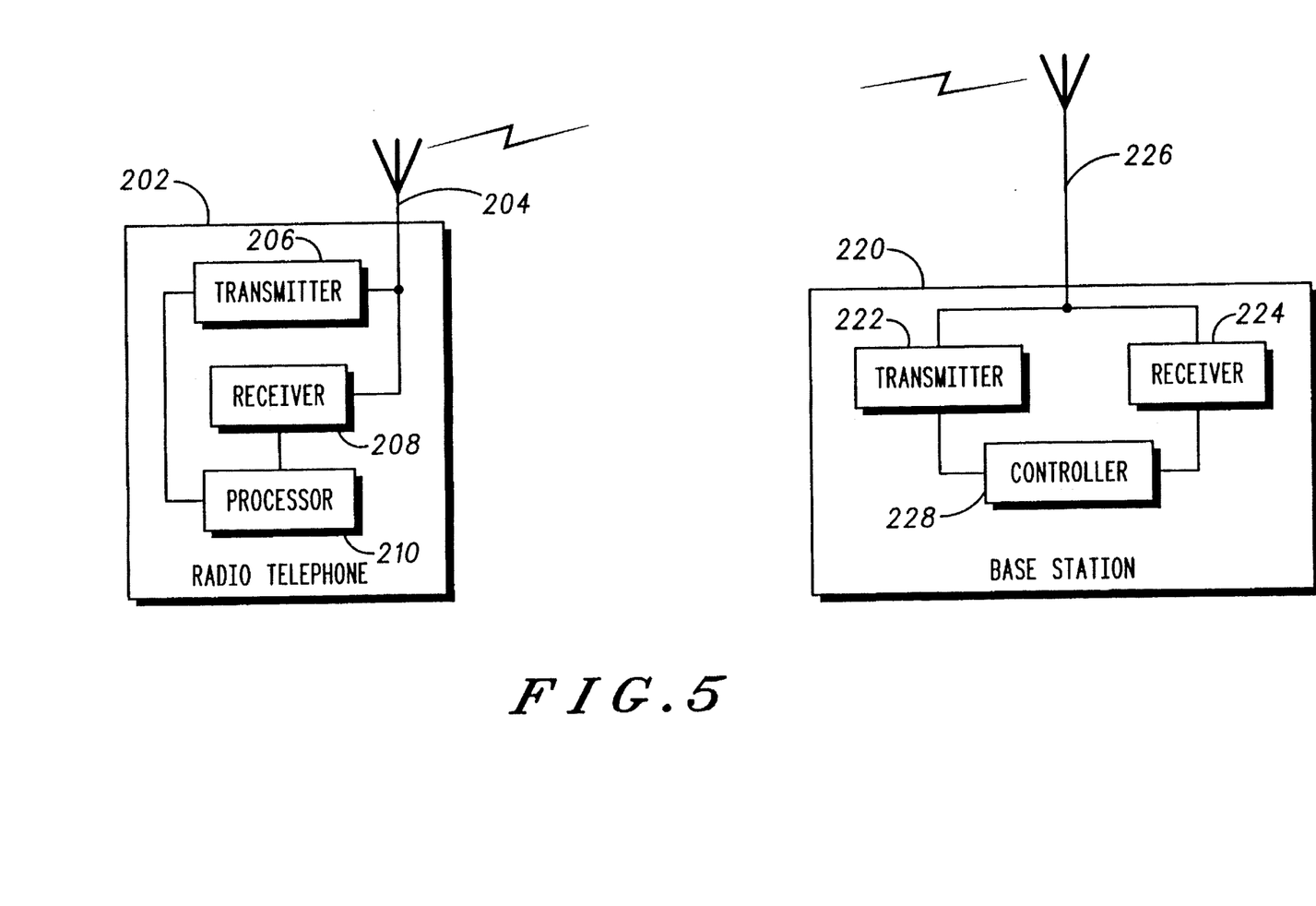
FIG. 5 illustrates a system block diagram of a radiotelephone system that uses the error correction method in accordance with the invention.

The error correction method of the invention can be used in a cellular radiotelephone system as shown in FIG. 5. A radiotelephone 202 has an antenna 204 connected to a transmitter 206 and a receiver 208. The radiotelephone 202 is constantly transmitting and receiving data messages from a base station 220, in an automatic repeat request procedure (ARQ). The base station has a transmitter 222 and a receiver 224 connected to an antenna 226. The radiotelephone 202 is controlled by a processor 210 and the base station 220 is controlled by a controller 228. The processor 210 and controller 228 implement the error correction method shown in FIG. 1 (A–C).

The extended error correction (EEC) process of the present invention reduces the message error rate for subaudible data communications. The process reduces the number of errors in the message to a single error, thus allowing the BCH error trapping decoder error correction to correct the last error.

For the purpose of illustrating the process of the present invention, the BCH error correcting of the NAMPS system will be used as an example. This process, however, can be used in any situation that transmits a message at least twice and uses a forward error correction process. A forward error correction process employs error correcting codes that automatically correct errors detected. S. Lin & D. Costello Jr., Error Control Coding, 12—14, (1983), discusses forward error correction in more detail.

Figure 1A:
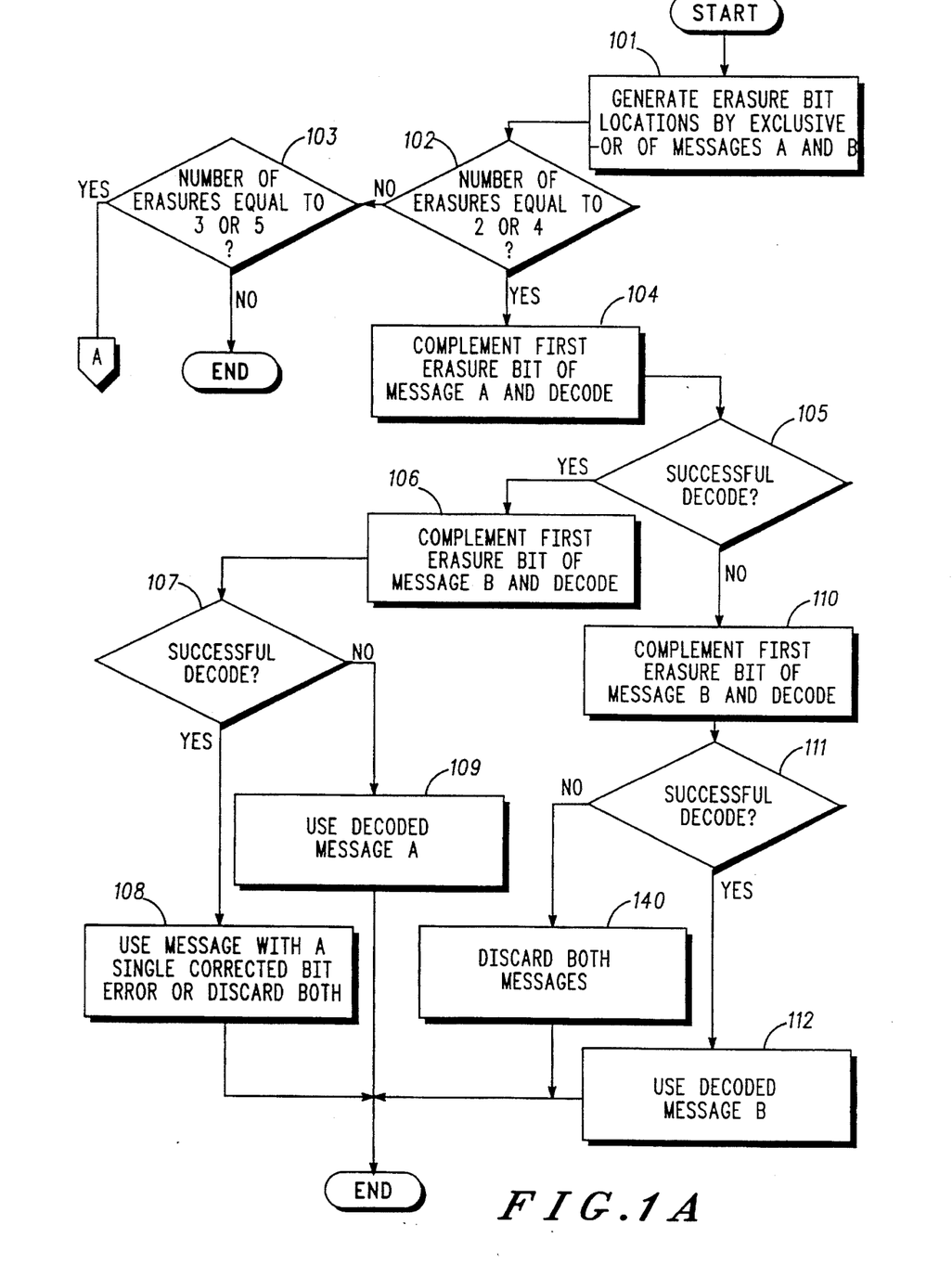
Figure 1B:
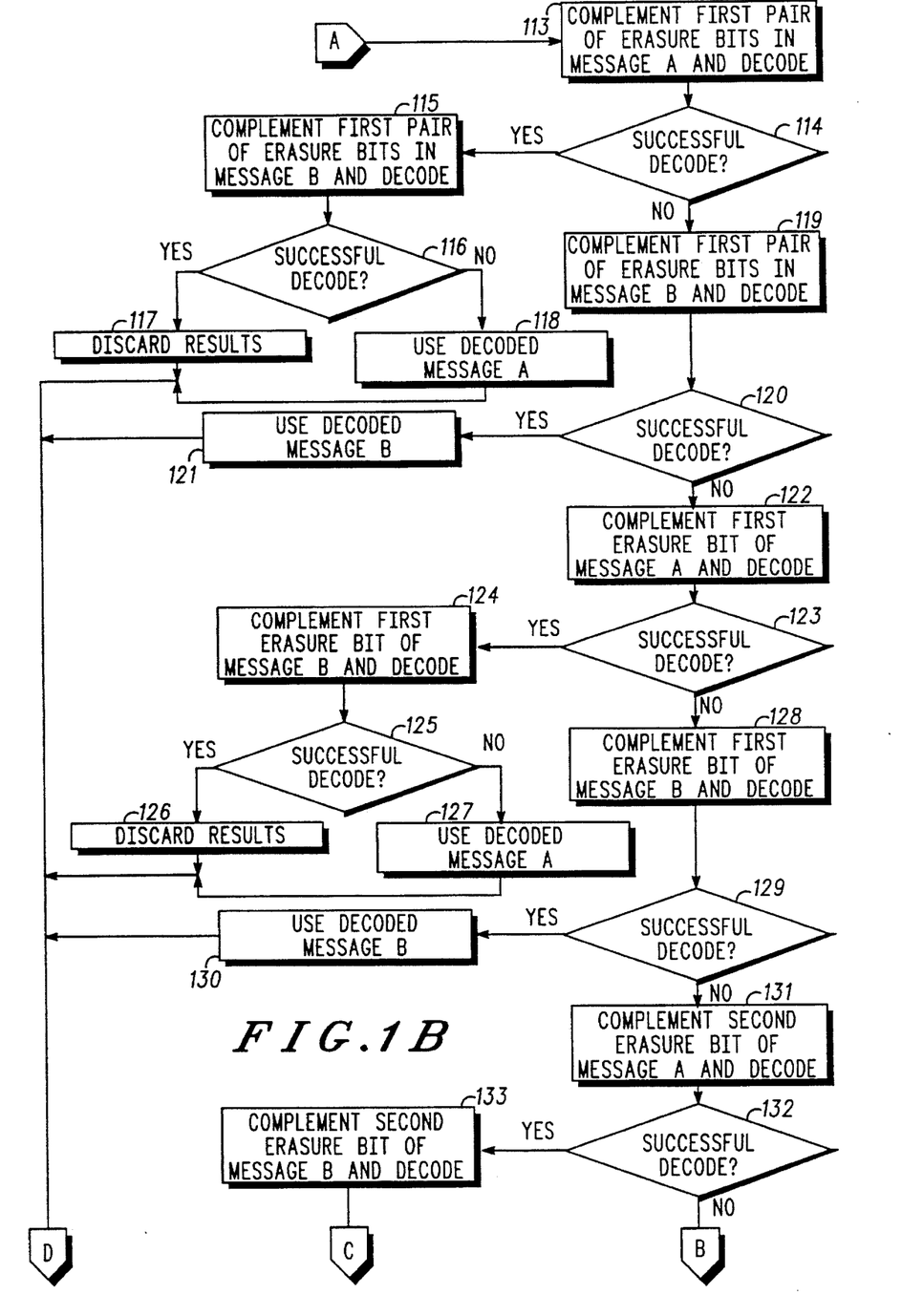
Figure 1C:
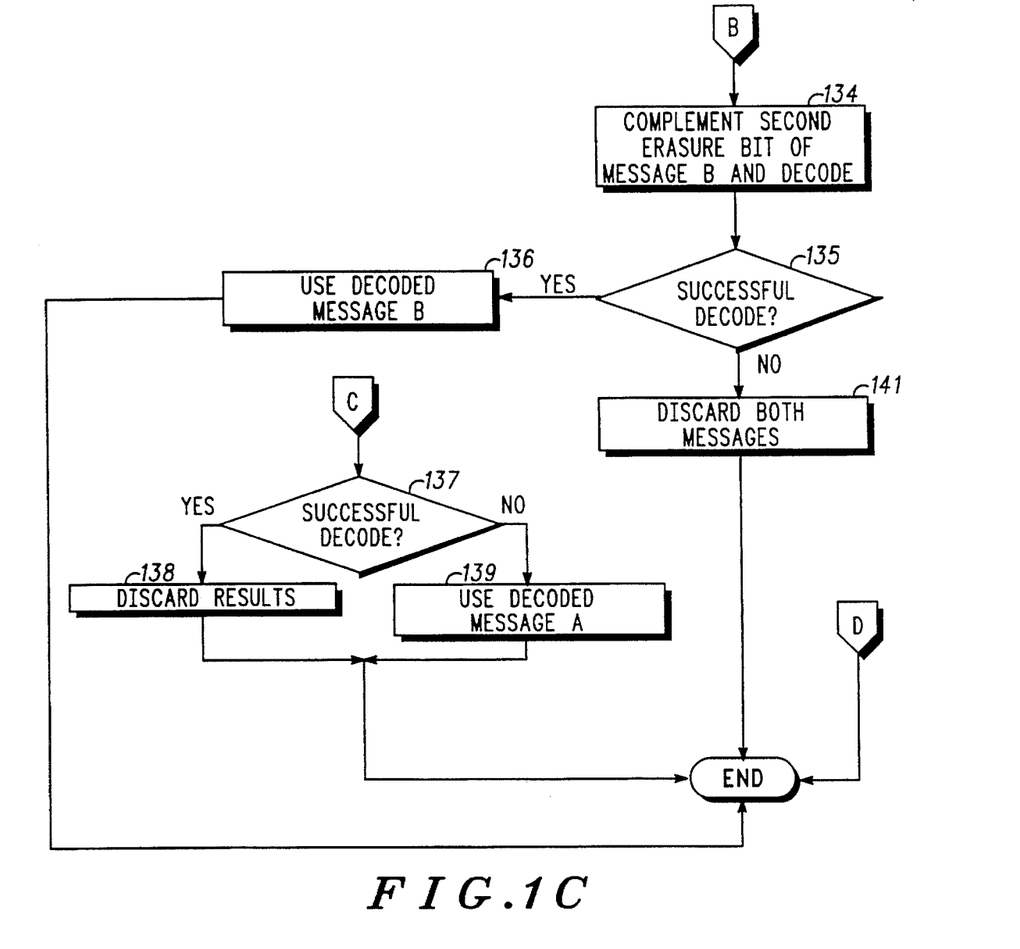

The process of the present invention is illustrated in the flowchart in FIG. 1. This process can be applied to ARQ messages after at least two messages have been received that could not be error corrected by the BCH error correction. The error correction process of the present invention could also error correct two of the specified three ARQ messages if one of the messages has been lost during transmission due to improper synchronization.

The process begins by generating erasure bit locations by exclusive ORing (XOR) the two received messages (101), subsequently referred to as messages A and B. The XOR operation creates an error indication word containing a logic one in each location indicative of the location of the error in either the A or B message. The number of errors in both messages determines which part of the error correction process of the present invention is used. If the error indication word indicates that two or four errors total exist in the two messages (102), a different error correction is performed than if three or five errors are found (103).

The XOR operation will not produce erasure bits in the error indication word for errors that are located in the same location in both messages. In this case, the messages contain invisible errors which could cause false decoding. This false decoding aspect will be discussed in more detail later.

Figure 4:
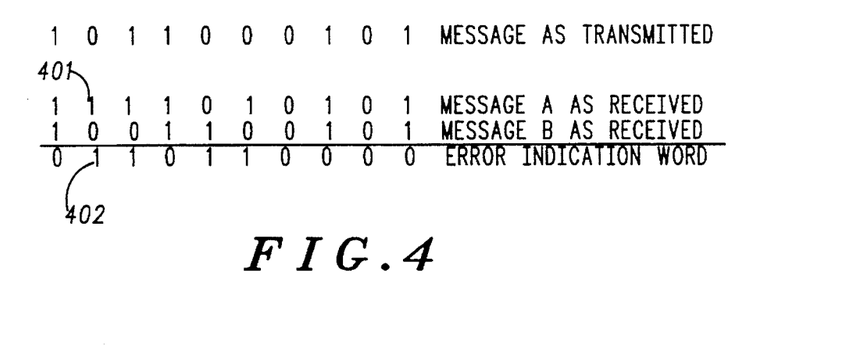
FIG. 4 shows an example of two messages and the resulting error indication word in accordance with the process of the present invention.

If two or four errors are found (102), a first erasure bit of message A is complemented (104). The location of this bit is indicated by the first logic one location of the error indication word. In the preferred embodiment, the first erasure bit starts from the left. Alternate embodiments can use a first erasure starting in any location. FIG. 4 illustrates the location of the first erasure bit of message A (401) as indicated by the first logic one location (402) of the error indication word.

Message A originally contained at least two errors or else the BCH error correction routine would have completed a successful error correction. After the first erasure is complemented, if the complemented bit is an error in message A, message A now contains, at the most, one error. This modified message can now be error corrected by the BCH error correction routine. Message A is now decoded (104).

If a successful decode is performed on message A (105), the first erasure of message B is complemented (106), the BCH error correction performed and the modified message decoded. If message B is not successfully decoded (107), message A is the correct message to use (109). If both messages were successfully decoded (108), then two different messages have been generated and one falsely decoded. This is due to the fact that the algorithm generated the error that falsed the error correction decoder. Two successful decodings, therefore, is only possible if one message was not decoded correctly. In this case, the message with a single corrected error is used or, if neither has a single corrected error, both messages are discarded.

If message A was not successfully decoded (105), the first erasure of message B is complemented and decoding is attempted (110). If message B is successfully decoded (111), message B is used (112). If message B has not been successfully decoded (111), then both messages are discarded (140).

If the number of erasures found in the error indication word totals three or five (103), another process is performed. The first pair of erasure bits in message A, indicated by the locations in the error indication word, are complemented (113). An attempt is then made to decode modified message A. If message A is successfully decoded (114), the same bit pair location in message B is complemented and an attempt to decode modified message B is performed (115).

If message B is also successfully decoded (116), two different messages have been generated by the bit pair complementing and one was falsely decoded. In this case, both messages are discarded (117). If message B is not successfully decoded (116), message A, which has already been successfully decoded, is used (118).

If message A was not successfully decoded (114), the same erasure bit pair that was complemented in message A is complemented in message B (119). An attempt is now made to decode modified message B. If message B is successfully decoded (120), message B is used (121).

The unsuccessful decoding of message B (120) indicates that the two errors are split between messages A and B. The process of the present invention, therefore, needs to proceed only on the first two erasures.

To accomplish this, the process complements the first erasure bit of message A and another attempt is made to decode message A (122). If a successful decode operation is performed (123), the same erasure bit location is complemented in message B and a decode is attempted (124). If message B is also successfully decoded (125), one message has been falsely decoded and both are ignored (126). This protects against falsely decoding the messages when the number of erasures is five with no invisible errors or the number of erasures is three with one invisible error. If message B is not successfully decoded (125), the message A has been successfully error corrected and the decoded message A is used (127).

If a successful decode is not achieved on message A (123), the same erasure bit location of message B is complemented and a decode operation performed (128). If message B is successfully decoded (129), then message B has been successfully error corrected and is used (130).

If message B has not been successfully decoded (129), the second erasure bit of message A is complemented and another attempt at decoding is performed (131), If message A has been successfully decoded (132), the same erasure bit of message A is complemented in message B and another decode attempt performed on the modified message B (133). If message B has been successfully decoded (137), two different messages have been generated by the bit pair complementing and one was falsely decoded. In this case, both messages are discarded (138). If message B has not been successfully decoded (137), message A has been successfully error corrected and message A is used (139).

If message A has not been successfully decoded (132), the second erasure bit of message B is complemented and a decode operation is performed on message B (134). If message B is successfully decoded (135), the message B has been successfully error corrected and this message is used (136). If message B has not been successfully decoded (135), then neither message A nor B have been successfully error corrected and both are ignored (141).

The process of the present invention requires, worst case, seven decodings to guarantee a correction. Without this process, at least thirty decodings would be needed to decode all erasure combinations.

For a linear code, an error pattern that is the same as a code message maps the transmitted code message into another code message. This is referred to as false decoding. When single bit error correction is applied, the error pattern must cover all but one of the possible code message bits to cause a false. The probability of false decoding, therefore, depends on the probability of an error pattern being generated by the EEC process of the present invention. For the (40, 28) BCH code, the most significant code pattern is the weight=5 code words. Fortunately, out of 658,008 possible weight=5 combinations, only 134 code words exist.

The determination of false decoding is further complicated by the existence of errors in the two received messages that occur on the same bit location. Due to the XOR operation, these errors are not located by the process of the present invention. The probability of a false decode due to an invisible error is determined in the following calculations. For the purposes of the calculations, it will be assumed that there are four erasures and one invisible error.

The EEC process may increase the number of errors in message B to four, which now includes one invisible error. This is illustrated as follows:

Message A: bbbebbbbbbbbbbbbbeb . . . b
Message B: bbbgbbbbebbebbbbbeb . . . b
Erasures: 000101001001000000i0 . . . 0
where b=received correct bit,
 e=received error bit,
 g=process generated bit error,
 i=invisible bit error.

Given that the "true" message transmitted at its source contains no errors in its bit locations, the "b" in Message A represents that the received bit of the true message has been correctly received and the "e" in Message A represents that received bit of the true message has been incorrectly received. That is, if each bit of received Message A were compared with the true message, then a "b" appears in Message in A when the bits match and an "e" appears in Message A when the bits do not match. Of course the value of "b" would be the value of the bit in the true message and the value of "e" would not be the value of the bit in the true message. The same holds for Message B.

The probability of this occurring is equal to the joint probability of an invisible error occurring and the probability that four errors will cause an incorrect decode. This is shown as:

$$Pfalse[e{=}4, i{=}1]{=}P[i{=}1] \times P[\text{incorrect decode}]$$

Given that at least two errors are known to exist in each message, A and B, the probability of an invisible error occurring is the probability that an additional error exists in the remaining 38 bits of each message and that this error of message A overlaps one of the three errors in message B. The probability of an additional error occurring in one of the 38 bits of both messages is:

$$P[\text{additional errors}]{=}p(1{-}p)^{37} \times p(1{-}p)^{37}{=}p^2(1{-}p)^{74}$$

where p is the probability of a bit error. The probability of an invisible error is:

$$P[i{=}1]{=}(3/38)P[\text{addtional errors}]{=}7.9\ E{-}2p^2(1{-}p)^{74}$$

The probability of an incorrect decode occurring with a four bit error pattern is the probability that four random errors overlap code words with weight=5. There are 134 (40, 28) BCH code words of weight=5.

$$P[\text{incorrect decode}]{=}(134/658{,}008){\times}5{=}1.0\ E{-}3$$

The probability of a false decode, therefore, is:

$$Pfalse[n{=}4, i{=}1]{=}P[i{=}1] \times P[\text{incorrect decode}]$$

$$Pfalse[n{=}4, i{=}1]{=}7.9E{-}5(p^2(1{-}p)^{74})$$

For p=0.01:
 $Pfalse[n{=}4, i{=}1]{=}3.76E{-}9$.

These calculations show that the probability of a false decode occurring due to an invisible error is extremely slight.

The process of the present invention can be extended to decode a larger number of errors if the BCH decoder has a larger error correcting capability. In other words, this process can always extend the error correcting capability beyond the error correction capability of the BCH decoder. The EEC process of the present invention can be used after the second message is received and while waiting for the third message, if one is required.

Figure 2:
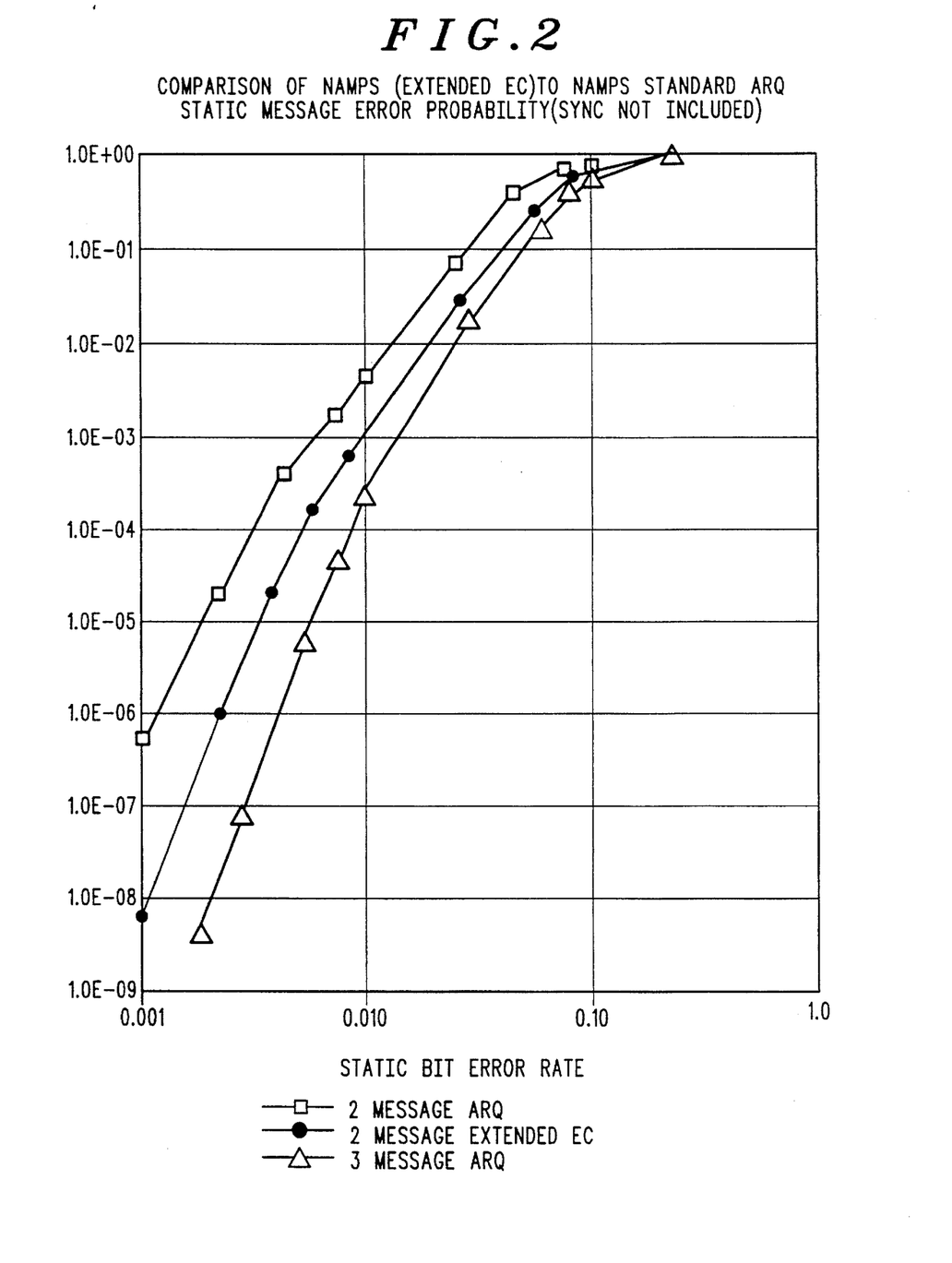
FIG. 2 shows a graph of the static bit error rate of the prior art automatic repeat request procedure versus error correction using the process of the present invention.
Figure 3:
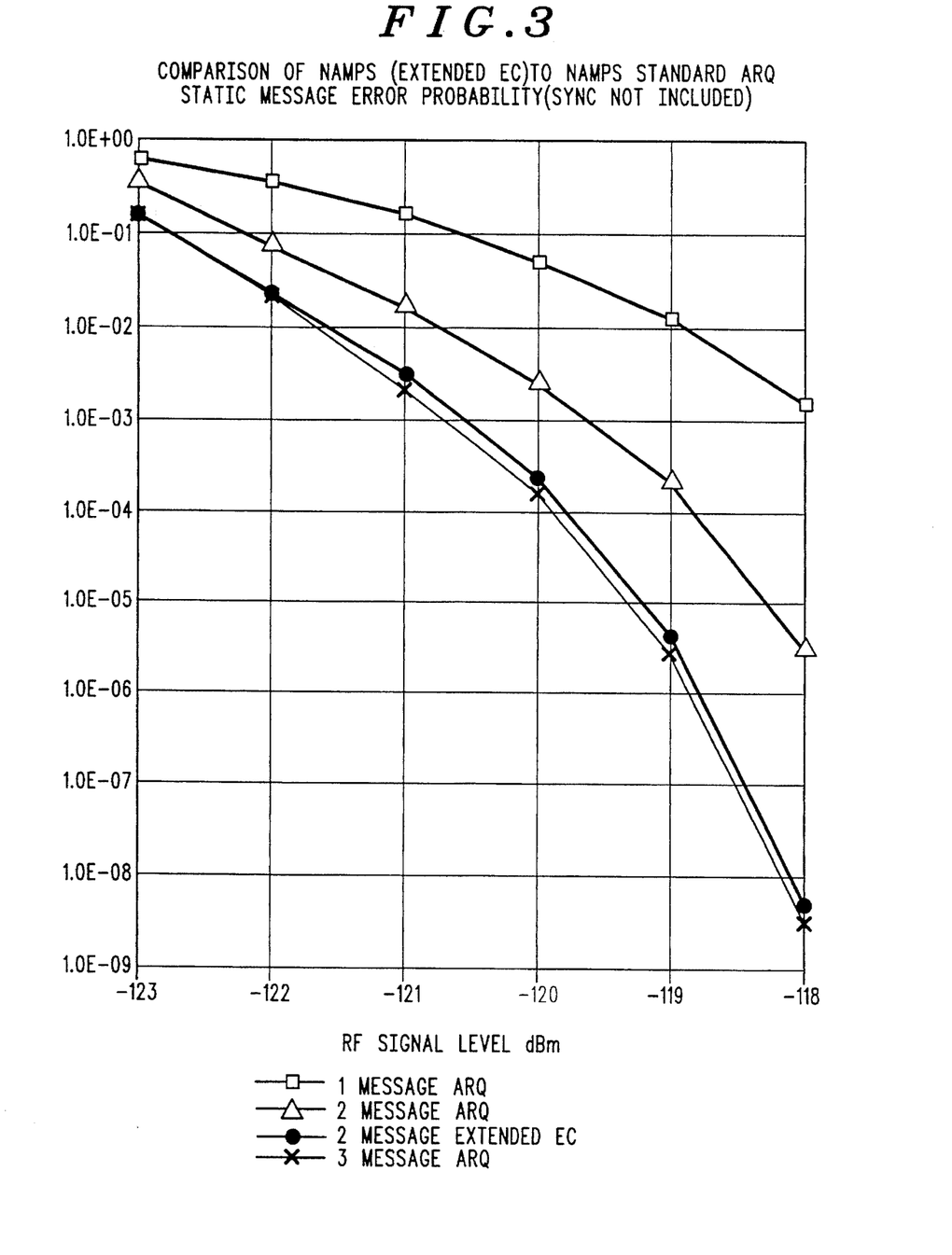
FIG. 3 shows a graph of an RF signal level for a signal error corrected by the prior art error correction versus an RF signal level for a signal error corrected with the process of the present invention.

The benefit of using the process of the present invention is illustrated in the graphs of FIGS. 2 and 3. The graph of FIG. 2 shows a comparison between the static bit error rate for a radiotelephone using the NAMPS standard ARQ and the NAMPS error rate for a radiotelephone using the error correction process of the present invention. The upper curve shows the message error probability after two messages. The next curve shows the message error probability after two messages and using the EEC process of the present invention. The bottom curve shows the message error probability after three messages.

FIG. 2 shows that the message error probability after receiving two messages and post processing with the EEC process of the present invention approaches the performance of standard NAMPS ARQ with three messages being received. Using the EEC process after the second message instead of waiting for a third message reduces the time required to error correct the message and send an acknowledgement to the transmitting unit.

The graph of FIG. 3 shows a comparison between the EEC process of the present invention and standard NAMPS ARQ as a function of RF signal level. Both figures show relative performance only and, due to the static conditions assumed, do not indicate actual performance gain over a fading RF channel.

In summary, a process for error correcting data messages has been shown. Although BCH code was used in the above discussion, the process of the present invention operates on bits, not types of encoding, and therefore, can be used on any two messages using any forward error correction process. This error correction process of the present invention extends the error correction accomplished by the forward error correction routine. By using the error correction process of the present invention, the message error rate is greatly improved.

What is claimed is:

1. A method for error correcting a data message that has been transmitted a plurality of times in a system using a forward error correction process, the data message comprising a plurality of bits, the method comprising the steps of:

receiving the data message at least a first and a second time;

logically combining the first and second receipts of the data message to form an error indication word;

if the error indication word indicates a first or a second predetermined number of errors, complementing a first error of the first receipt thus forming a first modified message;

if the first receipt has a number of errors correctable by the forward error correction process, decoding the first modified message;

if the first receipt is not decodable, complementing a first error of the second receipt thus forming a second modified message;

if the second receipt has a number of errors correctable by the forward error correction process, decoding the second modified message;

if the error indication word indicates a third or a fourth predetermined number of errors, complementing a first pair of errors of the first receipt thus forming a third modified message;

if the first receipt has a number of errors correctable by the forward error correction process, decoding the third modified message;

if the first receipt is not decodable, complementing a first pair of errors in the second receipt thus forming a fourth modified message;

if the second receipt has a number of errors correctable by the forward error correction process, decoding the fourth modified message;

if both the first and second receipts are not decodable, complementing an error bit in either the first or the second receipts; and if a successful decode is not accomplished, discarding the first and second receipts.

2. The method of claim 1 wherein the first and second predetermined number of errors are two and four errors.

3. The method of claim 1 wherein the third and fourth predetermined number of errors are three and five errors.

* * * * *